US011782996B2

(12) United States Patent
Jane et al.

(10) Patent No.: US 11,782,996 B2
(45) Date of Patent: Oct. 10, 2023

(54) ON-DEMAND LOCATION VISIT CONVERSION METRICS

(71) Applicant: Google LLC, Mountain View, CA (US)

(72) Inventors: Luis Barguno Jane, Zurich (CH); Ankit Gupta, Zurich (CH)

(73) Assignee: Google LLC, Mountain View, CA (US)

( * ) Notice: Subject to any disclaimer, the term of this patent is extended or adjusted under 35 U.S.C. 154(b) by 642 days.

(21) Appl. No.: 16/328,463

(22) PCT Filed: Nov. 9, 2017

(86) PCT No.: PCT/US2017/060842
§ 371 (c)(1),
(2) Date: Feb. 26, 2019

(87) PCT Pub. No.: WO2019/094015
PCT Pub. Date: May 16, 2019

(65) Prior Publication Data
US 2020/0125621 A1    Apr. 23, 2020

(51) Int. Cl.
*G06F 15/16*     (2006.01)
*G06F 16/9538*   (2019.01)
(Continued)

(52) U.S. Cl.
CPC ...... *G06F 16/9538* (2019.01); *G06F 16/9537* (2019.01); *H04W 4/023* (2013.01); *H04W 4/029* (2018.02); *H04W 8/183* (2013.01)

(58) Field of Classification Search
None
See application file for complete search history.

(56) References Cited

U.S. PATENT DOCUMENTS

| 8,239,130 B1 | 8/2012 | Upstill et al. |
| 9,084,013 B1 | 7/2015 | Arini et al. |
| (Continued) | | |

FOREIGN PATENT DOCUMENTS

| CN | 101796515 A | 8/2010 |
| CN | 104462263 A | 3/2015 |
| (Continued) | | |

OTHER PUBLICATIONS

The Ultimate Guide to Data Anonymization in Analytics, https://piwik.pro/blog/, 2018, pp. 1-6. (Year: 2018).*
(Continued)

*Primary Examiner* — Alex Gofman
*Assistant Examiner* — Shelly X Qian
(74) *Attorney, Agent, or Firm* — Lerner David LLP (57) ABSTRACT

Aspects of the technology evaluate whether a response to a client device search query results in the client device traveling to a location associated with the response (FIG. 1). One or more wireless stations are selected based on the location associated with the search query (604, 606). Wireless station identifiers are sent, along with the search results, to the client device (504, 610). The client device compares the received identifiers against the identifiers of one or more observed wireless stations with which the mobile device is in communication or are otherwise visible (508). Log information is generated by the client device as a result of the comparison (510). The log information is transmitted to the network without user ID or other client-identifiable information included in the log (512). The received log information is then used to accurately evaluate conversions and evaluate search quality, which enhances the user experience and provides for a more efficient search result process (612, 614).

20 Claims, 7 Drawing Sheets (51) Int. Cl.
*H04W 4/029* (2018.01)
*G06F 16/9537* (2019.01)
*H04W 4/02* (2018.01)
*H04W 8/18* (2009.01)

(56) References Cited

U.S. PATENT DOCUMENTS

| | | | | |
|---|---|---|---|---|
| 2007/0219708 | A1* | 9/2007 | Brasche | G08G 1/0962 |
| | | | | 701/457 |
| 2008/0140667 | A1* | 6/2008 | LaBiche | G06Q 30/06 |
| 2008/0208467 | A1* | 8/2008 | Ruckart | H04L 51/08 |
| | | | | 701/469 |
| 2008/0227463 | A1* | 9/2008 | Hizume | H04W 64/00 |
| | | | | 455/456.1 |
| 2008/0248815 | A1 | 10/2008 | Busch | |
| 2009/0138445 | A1 | 5/2009 | White et al. | |
| 2010/0088407 | A1 | 4/2010 | Fukui et al. | |
| 2011/0270673 | A1 | 11/2011 | Lin et al. | |
| 2012/0058778 | A1* | 3/2012 | Waters | G01S 5/0252 |
| | | | | 455/456.1 |
| 2013/0073454 | A1* | 3/2013 | Busch | H04L 67/22 |
| | | | | 705/39 |
| 2014/0351248 | A1 | 11/2014 | White et al. | |
| 2016/0088062 | A1 | 3/2016 | Sanada | |
| 2017/0164145 | A1 | 6/2017 | Lipman et al. | |
| 2017/0169451 | A1 | 6/2017 | Price et al. | |
| 2018/0373733 | A1* | 12/2018 | Andrew | G06F 16/29 |

FOREIGN PATENT DOCUMENTS

| | | |
|---|---|---|
| CN | 107040886 A | 8/2017 |
| JP | 201086150 A | 4/2010 |
| JP | 201662296 A | 4/2016 |
| JP | 2018519606 A | 7/2018 |
| WO | 2008120361 A1 | 10/2008 |
| WO | 2011137123 A2 | 11/2011 |
| WO | 2017106159 A2 | 6/2017 |

OTHER PUBLICATIONS

Notice of Acceptance for Australian Patent Application No. 2017366668 dated Jul. 3, 2020. 3 pages.
Examination Report No. 1 for Australian Patent Application No. 2017366668 dated Aug. 15, 2019. 5 pages.
International Search Report and Written Opinion for International Application No. PCT/US2017/060842 dated Jan. 8, 2018. 14 pages.
Extended European Search Report for European Patent Application No. 18188289.5, dated Nov. 14, 2018. 8 pages.
Examination Report No. 3 for Australian Patent Application No. 2017366668 dated Apr. 3, 2020. 4 pages.
Decision of Rejection for Japanese Patent Application No. 2018-541690 dated Mar. 30, 2020. 3 pages.
Examination Report No. 2 for Australian Patent Application No. 2017366668 dated Nov. 12, 2019. 5 pages.
Office Action for Canadian Patent Application No. 3,009,700 dated Apr. 25, 2019. 5 pages.
Office Action for Canadian Patent Application No. 3,009,700 dated May 4, 2020. 4 pages.
International Preliminary Report on Patentability for International Application No. PCT/US2017/060842 dated May 22, 2020. 8 pages.
Office Action for Canadian Patent Application No. 3,009,700 dated Jan. 20, 2021. 3 pages.
Pre-Appeal Examination Report for Japanese Patent Application No. 2018-541690 dated Sep. 11, 2020. 3 pages.
Examination Report for European Patent Application No. 18188289.5 dated Apr. 7, 2021. 8 pages.
Decision by the Board of Appeals and Notice of Allowance for Japanese Patent Application No. 2018-541690 dated Oct. 25, 2021. 40 pages.
Office Action for Canadian Patent Application No. 3,009,700 dated Sep. 2, 2022. 4 pages.
Office Action for Canadian Patent Application No. 3,009,700 dated Nov. 10, 2021. 4 pages.
Summons to Attend Oral Proceedings for European Patent Application No. 18188289.5 dated Jul. 18, 2022. 12 pages.
Provision of a the minutes in accordance with Rule 124(4) EPC for European Patent Application No. 18188289.5 dated Jan. 4, 2023. 8 pages.
Decision to Refuse for European Patent Application No. 18188289.5 dated Jan. 9, 2023. 21 pages.
Result of Consultation for European Patent Application No. 18188289.5 dated Dec. 2, 2022. 14 pages.
Office Action for Chinese Patent Application No. 201780091432.X dated Nov. 24, 2022. 9 pages.

* cited by examiner

ON-DEMAND LOCATION VISIT CONVERSION METRICS

CROSS-REFERENCE TO RELATED APPLICATIONS

The present application is a national phase entry under 35 U.S.C. § 371 of International Application No. PCT/US2017/060842, filed Nov. 9, 2017, the entire disclosure of which is incorporated herein by reference.

BACKGROUND

Web-based searching provides users with a variety of useful information, including information about products and services offered at a store, restaurant or other place of business. In a typical browser-based application, the user may request information about products or services relating to a particular location or within an area of interest. It is important to determine whether the user actually took advantage of this information. Certain systems estimate this by evaluating a click-through rate (CTR). The CTR is a ratio of the number of users who click on a link for a particular piece of information relative to the total number of users who were provided with the link Other similar metrics and analytics may be employed, but often merely provide just a rough estimate as to whether a user actually relied on the provided information.

BRIEF SUMMARY

It is important to implement more effective ways to determine whether a user takes advantage of the provided information. This is because knowing whether the user took advantage of the information will tell a provider how relevant the search results were. It may also suggest ways to potentially present future results in a manner that is more meaningful to users.

In some cases it is possible to evaluate the conversion rate for received information, such as search results, when a user enables the system to receive information about their location history. Here, one can cross reference the location history with search results and clicks to get enhanced CTR metrics. For instance, if the user clicked on a search result associated with a particular business and also visited that business, it would be counted as a conversion. However, this may apply to a very small subset of users that has enabled permissions regarding their search history and device's location history. And that small subset may not be enough to provide relevant statistics.

Aspects of the technology allow a system to measure search quality in accordance with a user being able to actually find items or services of interest resulting from their searches. In accordance with this, the technology determines whether a user subsequently visited the location or area associated with the provided information. The technology does not require collection or exportation of individual location information per user over time. Rather, wireless station information is provided to the client device along with location-based search results. The client device can then determine whether a particular wireless station is subsequently visible, in other words is within communication range. This may be done, for instance, by matching an observed WiFi ID to a stored WiFi ID received as part of the received wireless station information. One benefit is that this approach is very cheap from a computational or processing power standpoint. And it effectively uses no extra power, thereby not adding any burden on the client device. Any matches between observed and stored IDs can be saved locally on the client device and subsequently some indicator associated with such matches is returned to the network. In this case, anonymized results may be provided to a network element such as a web server. As a result, the system can accurately track conversions and track search quality, which enhances the user experience and provides for a more efficient search result process. A user may be provided with controls allowing the user to make an election as to both if and when systems, programs or features described herein may enable collection of certain information, and if the user is sent content or communications from a server. Thus, the user may have control over what information is collected, how that information is used, and what information is provided to the user.

According to one aspect of the disclosure, a client device is configured to receive a search query from a user and send a search request, derived from the user's search query, to a search service server. It is also configured to receive, from the search service server, a response including one or more search results. The response also includes at least one wireless station identifier for at least one wireless station located at a point of interest. The client device is further configured to store the received at least one wireless station identifier in memory of the client device, identify, using a communication module of the client device, one or more wireless station identifiers of one or more observed wireless stations, and, in response to determining that the client device has detected a wireless station identifier for an observed wireless station that matches one of the stored at least one wireless station identifiers, transmit a message identifying the match to a tracking service server.

In one example, one or more processors of the client device are configured to match the wireless station identifier for the observed wireless station with the stored at least one wireless station identifier by analyzing detected wireless signals from the observed wireless station for greater than a threshold period of time. Prior to transmitting the message identifying the match to the tracking service server, matching data may be stored in memory of the client device as log information. Here, the transmitted message may include the log information. In other examples, one or more processors of the client device are configured to perform statistical randomization on a portion of the log information prior to transmitting the message to the tracking service server.

According to another aspect, a computer-implemented method is provided. The method comprises receiving a search query from a user of a client device and transmitting, by the client device, a search request in accordance with a search query to a search service server. The method also includes receiving, at the client device from the search service server, a response to the search request. The response includes one or more search results and at least one wireless station identifier for at least one wireless station located at a point of interest. The method further includes storing, in memory of the client device, the received at least one wireless station identifier, identifying, using a communication module of the client device, one or more wireless station identifiers of one or more observed wireless stations, and, in response to determining that the client device has detected a wireless station identifier for an observed wireless station that matches one of the stored at least one wireless station identifiers, transmitting a message identifying the match to a tracking service server.

In one example, matching the wireless station identifier for the observed wireless station with the stored at least one wireless station identifier includes analyzing detected wireless signals from the observed wireless station for greater than a threshold period of time. Prior to transmitting the message identifying the match to the tracking service server, the method may include storing matching data in memory of the client device as log information. The transmitted message may include the log information. And the method may further comprise performing statistical randomization on a portion of the log information prior to transmitting the message to the tracking service server.

In another aspect, computer-readable instructions are provided, which when executed by a computing apparatus, cause the aforementioned method to be performed.

A further aspect provides a server system, which comprises a processing module including one or more processors, a memory module having one or more memories configured to store data and instructions for execution by the processing module, and a communication module including a wireless transceiver configured for bidirectional communication with one or more remote devices including one or more wireless stations and one or more client devices. The processing module is operatively coupled to the communication module and is configured to receive a search query from a client device, identify a location relevant to the received request, generate a response to the received request including one or more search results associated with the identified location, determine at least one wireless station identifier for at least one wireless station located at a point of interest at the identified location, and transmit the response and the at least one wireless station identifier to the client device. The processing module is further configured to, in response to the transmission, receive a message from the client device. The message identifies that the client device has detected a wireless station identifier for an observed wireless station that matches one of the stored at least one wireless station identifiers. The processing module is also configured to determine, from the received message, whether a conversion occurred at the identified location.

In one example, the one or more processors are configured to determine whether the conversion occurred by analyzing whether the detected wireless station identifier for the observed wireless station matched the one of the stored at least one wireless station identifiers for greater than a threshold period of time. The message may include log information indicative of whether a match occurred for a given one of the at least one wireless station identifiers. The one or more processors of the processing module are also configured to purge the message from memory after a selected period of time.

In one scenario, the client device includes a first client device and a second client device associated with a user. Here, the search query is received from the first client device associated with a user, the response is transmitted to the first client device, the at least one wireless station identifier is transmitted to the second client device associated with the user, and the message is received from the second client device.

Yet another aspect provides a computer-implemented method, comprising receiving a search query from a client device; identifying a location relevant to the received request; generating, by one or more processors of a server system, a response to the received request including one or more search results associated with the identified location; determining, by the one or more processors of the server system, at least one wireless station identifier for at least one wireless station located at a point of interest at the identified location; and transmitting the response and the at least one wireless station identifier to the client device. In response to the transmission, the method includes receiving a message from the client device, the message identifying that the client device has detected a wireless station identifier for an observed wireless station that matches one of the stored at least one wireless station identifiers. The method also includes determining from the received message, by the one or more processors of the server system, whether a conversion occurred at the identified location.

In one example, the determining whether the conversion occurred includes analyzing whether the detected wireless station identifier for the observed wireless station matched the one of the stored at least one wireless station identifiers for greater than a threshold period of time. The message may include log information indicative of whether a match occurred for a given one of the at least one wireless station identifiers. The method may further comprise purging the message from memory of the server system after a selected period of time.

In another example, the client device includes a first client device and a second client device associated with a user. Here, the search query is received from a first client device associated with a user, the response is transmitted to the first client device, the at least one wireless station identifier is transmitted to a second client device associated with the user, and the message is received from the second client device.

Yet another aspect of the disclosure includes computer-readable instructions. The instructions, when executed by a computing apparatus, cause the aforementioned method to be performed.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

The system maintains information regarding WiFi access points or other types of base stations or ad hoc arrangements, including Bluetooth transmitters, personal area network devices such as IEEE 802.15.4-compliant devices and the like (collectively, wireless stations) that are associated with businesses and other points of interest. The information includes wireless station IDs with their corresponding locations, such as a physical location, name of the business, etc. This information is stored on the network side, for instance in databases of one or more servers.

Upon receipt of a client-side search query or other request from a client device, the network side identifies a location relevant to the request. A set of one or more wireless stations is selected using the identified location. Information about one or more WiFi access points associated with the identified location will be sent to the client device as part of the response to the query. In one example, this may include the ID for a WiFi access point located at a store or point of interest associated with a search query. If the store has multiple access points or other wireless stations, some or all of IDs for the wireless stations may be flagged. Optionally, the IDs of other nearby wireless stations may also be flagged.

Location relevant content responsive to the search query is also obtained. This may include information about a product or service associated with a business at the identified location. It may also include advertising-related information, for instance about sales, offers or promotions.

The response to the search query includes information about selected wireless station IDs. In one example, the query response and set of wireless station IDs are provided together, such as in one or more data packets. In another example, the query response and set of wireless station IDs may be provided separately.

On the client side, once the device receives the response it is able to act on the search results or other information. The client device also stores the received wireless station IDs in memory. For instance, the application or other service that issued the query or other request may provide relevant search results to a user of the client device. The client device also evaluates the received wireless station IDs. In particular, one or more processors of the client device may compare the stored IDs against scanned information obtained by the client device's wireless receiver (or transceiver). By way of example, during typical operation the client device may routinely scan for available WiFi access points and/or other wireless stations. The IDs of any such wireless stations that are visible (e.g., are within communication range), are compared against the stored IDs.

If there is a match, that information is stored by the client device. In particular, the mobile device may create log information indicating whether there are matches. For instance, the log may include wireless station ID and a "visited" indicator. There is no need to include timing information about when the wireless station was "visited". Or the log data may include a simple Boolean indicator, where a 1 equals true (match of the IDs) and a 0 equals false (no match of the IDs). Or the log may act as a counter, where the total number of matches is incrementally increased. Regardless of the format of the log data, it does not include client-specific information, thus anonymizing the log.

Figure 1:
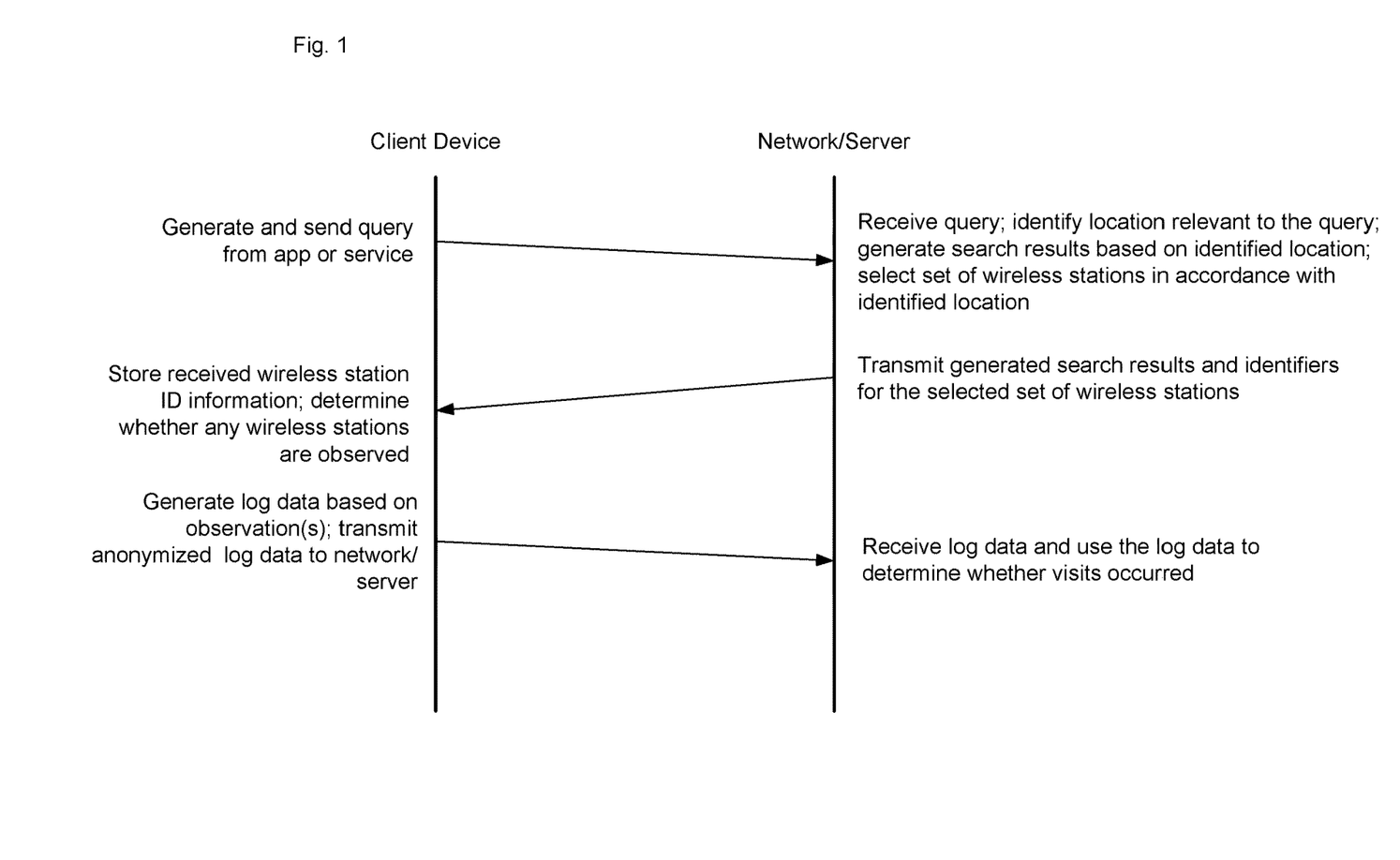
FIG. 1 illustrates a search result evaluation procedure in accordance with aspects of the disclosure.
Figure 2A:
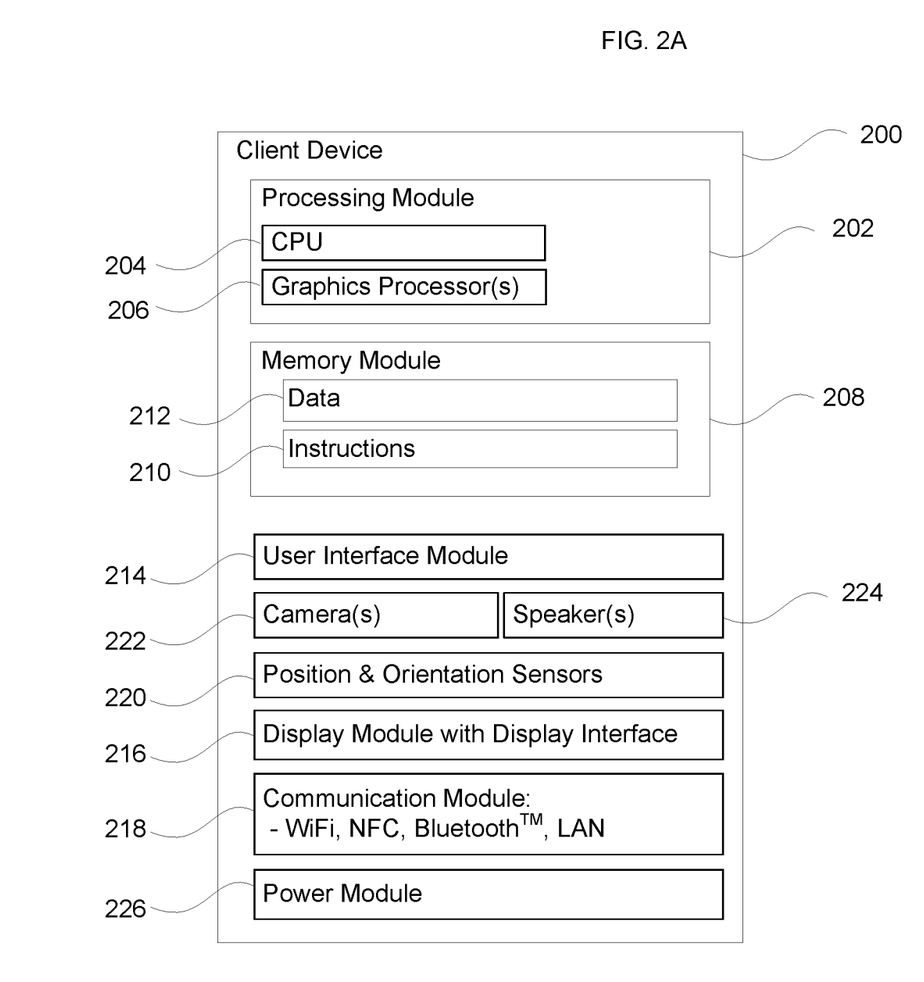
FIG. 2A is an example mobile client device in accordance with aspects of the disclosure.

In one scenario, the log information may be accumulated over a given period of time, e.g., an hour, day, etc., before being transmitted to the network. In another scenario, the log information is transmitted immediately upon determination of a match. This information, once received at the network, may be aggregated and used to evaluate possible conversion rates. FIG. 1 illustrates an example query and response process in accordance with the above discussion. These and other aspects of the technology are further described below.
Example Arrangement FIG. 2A illustrates an example client device 200 that may be employed with the techniques disclosed herein. As shown, the device 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 having a display interface.

User interface module 214 may receive commands from a user via user inputs and convert them for submission to a given processor. The user inputs may include one or more of a touch screen, keypad, mouse, stylus, microphone, or other types of input devices. The display module 216 may comprise appropriate circuitry for driving the display device to present graphical and other information to the user. By way of example, the graphical information for a browser or other application may be generated by the graphics processor(s) 206, while CPU 204 manages overall operation of the client device 200. The graphical information may display responses to user queries on the display module 216. For instance, the processing module may run a browser application or other service using instructions and data stored in memory module 208, and present information associated with the browser application or other service to the user via the display module 216.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVDs, CD-ROMs, high-density tape drives, and other types of write-capable or read-only memories. In one implementation, a computer program product is tangibly embodied in an information carrier. The computer program product contains instructions, such as instructions 210 that, when executed by one or more processors, perform one or more methods such as those described herein. The information carrier is a computer- or machine-readable medium, such as memory module 208. Although FIG. 2A functionally illustrates the processor(s), memory module, and other elements of device 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 2A, the client device 200 includes a communication module 218 for communicating with other devices and systems. The communication module 218 includes a wireless transceiver (or separate transmitter and receiver); alternatively, the module may include a wired transceiver in addition to or in place of the wireless transceiver. The client device 200 may communicate with other remote devices via the communication module 218 using various configurations and protocols, including short range communication protocols such as near-field communication, Bluetooth™ Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the client device 200 as shown includes one or more position and orientation sensors 220. The position and orientation sensors 220 are configured to determine the position and orientation of client device 200. For example, these components may include a GPS receiver to determine the device's latitude, longitude and/or altitude as well as an accelerometer, gyroscope or another direction/speed detection device. The client device 200 may also include one or more camera(s) 222 for capturing still images and recording video streams, speaker(s) 224 and a power module 226, as well as actuators (not shown) to provide tactile feedback or other information to the user.

Figure 2B:
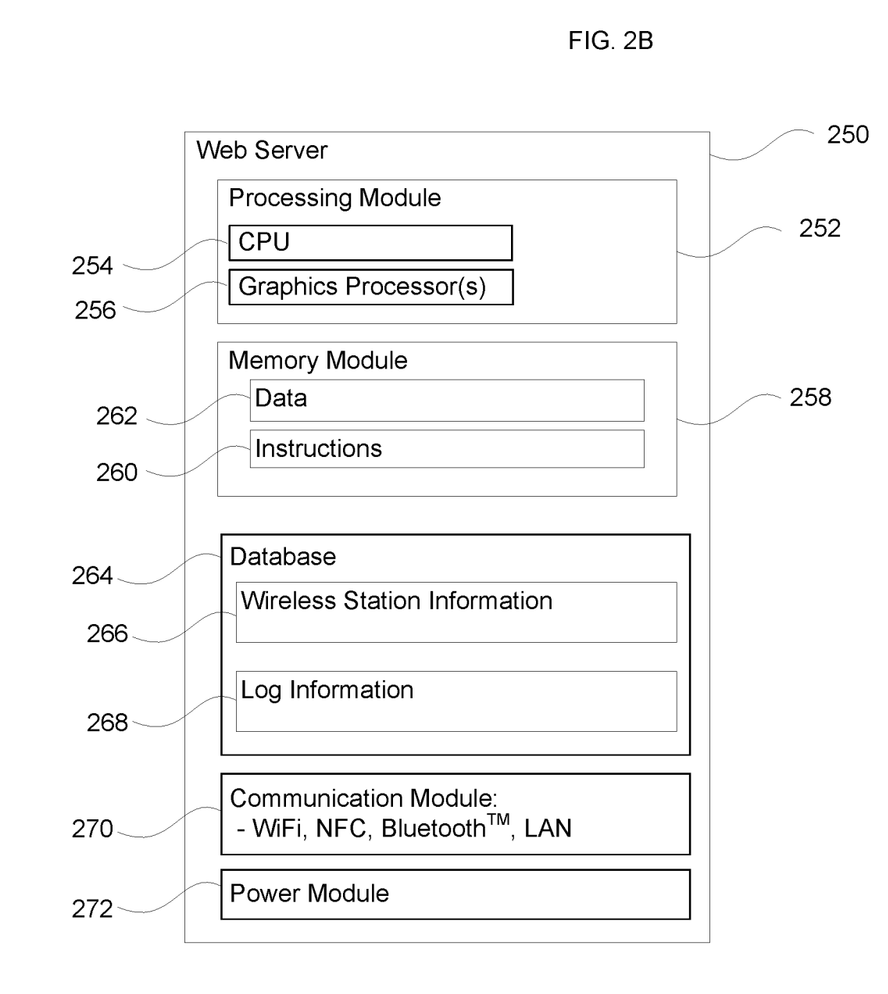
FIG. 2B is an example server system in accordance with aspects of the disclosure.

FIG. 2B illustrates an example web server 250 that may be employed with the techniques disclosed herein. As shown, the web server 250 includes various components similar to those described above for the client device 200. For instance, the web server includes a processing module 252 having one or more computer processors such as a central processing unit 254 and/or graphics processors 256, as well as memory module 258 configured to store instructions 260 and data 262. The processors may or may not operate in parallel, and may include ASICs, controllers and other types of hardware circuitry.

As with memory module 208, memory module 258 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 258 may also include DVDs, CD-ROMs, high-density tape drives, and other types of write-capable or read-only memories. In one implementation, a computer program product is tangibly embodied in an information carrier. The computer program product contains instructions, such as instructions 260 that, when executed by one or more processors, perform one or more methods such as those described herein. The information carrier is a computer- or machine-readable medium, such as memory module 208. Although FIG. 2B functionally illustrates the processor(s), memory module, and other elements of web server 250 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 262 of memory module 258 may be retrieved, stored or modified by the processors in accordance with the instructions 260. For instance, although the claimed subject matter is not limited by any particular data structure, the data may be stored in computing device registers, in a relational database as a table having a plurality of different fields and records, XML documents or flat files. The data may also be formatted in any computing device-readable format. As with instructions 210, the instructions 260 may be any set of instructions to be executed directly (such as machine code) or indirectly (such as scripts) by the processor(s), and the above discussion of instructions 210 applies to instructions 260 as well.

By way of example, the processors of the processing module 252 may be arranged in a distributed architecture. In a distributed architecture, the server system 250 may comprise multiple server units, for instance in a cloud computing arrangement. Whether in an inclusive or distributed architecture, the processors are operatively coupled to database 264. As shown, the database 264 includes information 266 about wireless stations in the network associated with the server system 250. For example, this information may wireless station identifiers and/or other information about the wireless stations associated with stores, other businesses and points of interest.

In one example, the wireless station information 266 includes the unique identifiers for WiFi access points and other wireless stations. Geolocation data about the specific physical locations of the wireless stations may also be stored, for instance in the form of a reverse map of location information to wireless stations. The map may be a WiFi access point map including the unique IDs, latitude and longitude coordinates and other data corresponding to the wireless stations, such as the names of the businesses or other entities associated with the wireless stations. The map may include a spatial index of the wireless stations in the network or a region within the network.

The database 264 may also include log information 268 received from various client devices. The log information 268 is received in response to the wireless station ID comparison performed at the client devices. Upon receipt by the server system, the log information from a given client device may be aggregated with log information from other client devices. As noted above and as discussed further below, the log information is provided by the client devices in an anonymized manner. It is unnecessary to indicate which particular client device visited a particular location at a given point in time. Thus, such information is not received from the client devices and is not stored in the log information 268.

While the database 264 is shown as including both wireless station information 266 and log information 268, such information may be stored in multiple discrete databases. The databases may be distributed, for instance across multiple memory modules or other storage devices of a cloud computing architecture.

As also shown in FIG. 2B, the web server 250 includes a communication module 270 for communicating with other devices and systems, including with client devices and other elements in the network. The communication module 270 includes a wireless transceiver (or separate transmitter and receiver). The communication module 270 may also include a wired transceiver in addition to or in place of the wireless transceiver. The web server 250 may communicate with other remote devices via the communication module 270 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the web server 250 as shown includes a power module 272. Other system elements, including computer components shown in FIG. 2A, may also be included within the server system 250.

Figure 3:
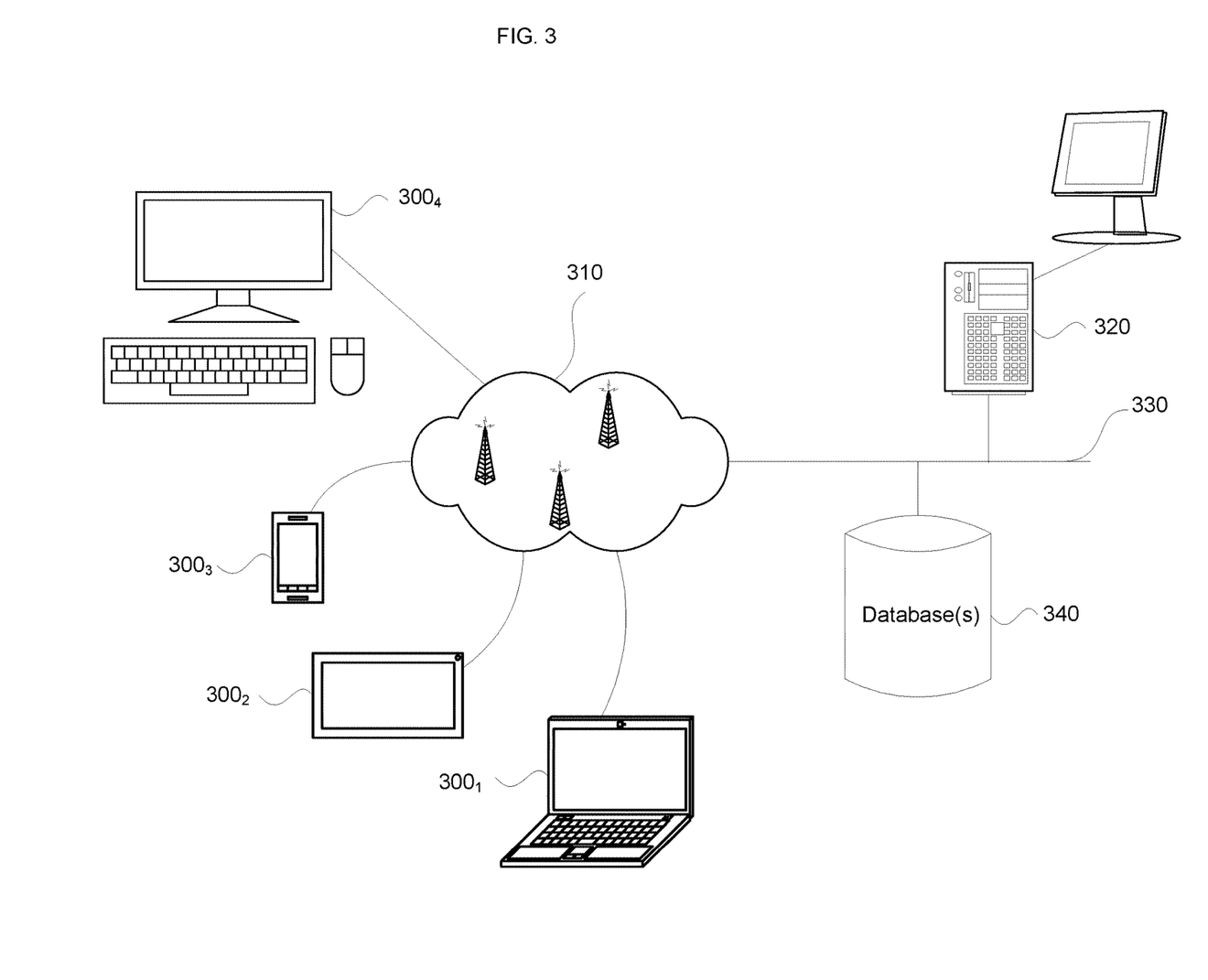
FIG. 3 illustrates an example network in accordance with aspects of the disclosure.

FIG. 3 illustrates an example arrangement in which different client devices 300, e.g., 300₁, 300₂, 300₃ and 300₄ may request content or other information from server 320 via communication system 310. The client devices 300 may include some or all of the components discussed above with regard to client device 200. The client devices may include mobile/portable devices such as laptops (300₁), tablets (300₂), cellular phones or PDAs (300₃), or quasi-stationary devices such as desktop PCs (300₄). However, other client devices, including wearable electronics such as smart watches or head-mounted display systems, may also be employed. Any such client device may send requests as shown in FIG. 1 and receive query results and wireless station information from the web server as discussed herein.

By way of example only, the client device queries may be parsed and routed to a service on the network. The service may include a query response service and a location identification service associated with server 320. While one server is shown, the functionality of the location identification and query response services may be performed by one or more server devices or other computer systems, such as a cloud computing network. The queries, IP location estimates and corresponding responses may be passed via bus 330. One or more databases 340 (corresponding to database 264 of FIG. 2B) may be used by the services to resolve the client device location based on its estimated location, and/or to provide relevant query results in accordance with the estimated location information.

In one scenario, searches may originate at one client device with results being provided to a different device associated with the same user. For example, the user may submit a query via their desktop or laptop computer, and results may be provided so that they are accessible to the user's mobile phone or tablet device.

Example Methods and Use Cases

As noted above, features of the technology can be implemented in different use cases. Example use cases are discussed below. For instance, in one use case the user may request information via a mobile app or service on the client device. By way of example, the information could be about a point of interest such as a restaurant, coffee shop, car dealership, museum, etc. Other use cases may involve on-line shopping or other order placement. Further examples may include map or direction queries. Nonetheless, the technology is query and search result-agnostic.

Regardless of the type of query or the application or service managing the query, a request based on the query is sent to the network via the communication module of the client device. Upon receipt by the communication module of the web server, the query is analyzed by the processing system of the web server and a location relevant to the query is identified. Based on this identification, the web server selects one or more wireless stations at or near the location as candidates for detection by the client device.

In particular, one or more wireless stations are selected that the client device should see when the client device is at (or near) the identified location. The wireless stations may include WiFi access points and the like. In one instance, different types and combinations of such stations may be selected.

In one example, the selected stations are chosen such that they are within a particular store or building. In one scenario, the search results selected by the web server are associated with a given store at the identified location. The store may have one or more WiFi access points, and the access point ID information is stored in the web server database. Other WiFi access points may be nearby, such as in an adjacent store in the same building (e.g., a mall), or on a different floor of the building.

The web server returns both the query response and the selected set of wireless station IDs. At the client device, the query is processed by the app or service that made the request so that relevant information may be presented to the user via the display system, audio system, haptic feedback system or any combination thereof. This may include providing a list of search results, a map and/or other data that is displayed to the user.

The client device also stores the received set of wireless station IDs. Then, at some point in the future, which may be a minute, hour, day, etc., later, the client device compares the stored IDs against the IDs of visible wireless stations that are within communication range of the transceiver of the client device. When a match is made, that information is stored locally at the client device in a log. As noted above, the log may merely include the ID of a given wireless station and an indicator that it was "visited" (e.g., there was an observed match).

Figure 4:
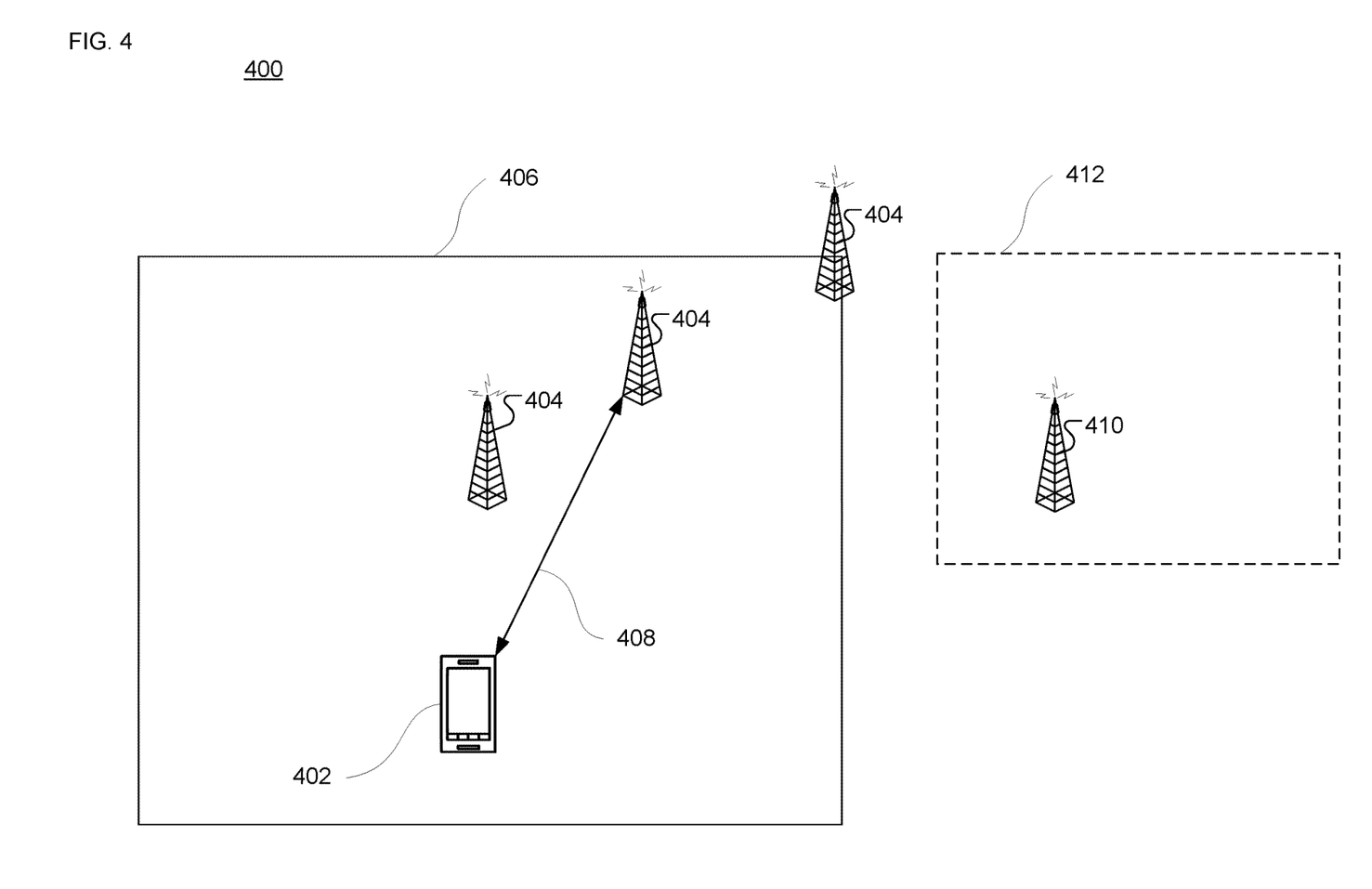
FIG. 4 illustrates an example of wireless stations relative to a client device in accordance with aspects of the disclosure.

In the example 400 of FIG. 4, client device 402 is shown at a particular location where there may be one or more wireless stations 404. For instance, client device is within store 406. The client device 402 may be in active communication with one wireless station 404 as shown by line 408. The other wireless stations within or adjacent to the store 406 may be part of a set of wireless stations that is visible to the client device even though it is not actively communicating with them. That may change as the client device moves, as atmospheric conditions or received signal strength change, as more devices communicate on the network or due to other factors. The active wireless station may change and the client device may be handed off or otherwise connect to a different wireless station. Regardless, the client device may maintain a list of active and/or visible wireless stations in memory. The IDs of such wireless stations are compared against the received set of IDs as explained above.

As shown in FIG. 4, there may be other wireless stations such as wireless station 410 in an adjacent or nearby store 412, or the wireless station 410 may be located on another floor of the building in which store 406 is located. The ID information for the wireless station 410 may also have been provided to the client device in response to the search query. Thus, as the client device moves towards or away from the store 406, the client device may observe the wireless station 410. The fact that the client device has matched the received ID information with any of these wireless stations can be used to indicate that the store 406 was visited with a high degree of certainty.

The client device 402 may note, e.g., in the log information, whether there was either an active communication link with a particular wireless station or that the wireless station was merely visible to the client device. Other information such as the duration of the connection, duration of visibility, signal strength (e.g., RSSI) and other wireless metrics may also be obtained and stored by the client device. Supplemental information including whether other nearby wireless station IDs are visible can also be maintained. This information may or may not be included in the log information.

The log information may be accumulated over a given period of time, e.g., an hour, day, etc. before transmission to the network, for instance back to the web server to which the initial search query was submitted. Alternatively, the log information may be transmitted immediately if desired. Once transmitted, the log information may be deleted from memory of the client device.

It is important to note that when the log information is sent to the network by the client device, no user ID or other client-identifiable information is included in the log. As an added layer of security, statistical randomization may be performed on the log data. One approach to statistical randomization includes randomly changing the "visited" indicator to a "not visited" status, and vice versa. This may be performed on a predetermined amount of the log information. By way of example only, the processing system of the client device may perform such statistical randomization on 10% of the log information. In another example, at least 5% of the log information is randomized. And in a further example, no more than 25% of the log information is randomized.

Regardless of the specific approach taken to introduce statistical randomization into the log data, it provides additional security and privacy protection. This anonymized log data is sent to the server system. On the server side, as noted above the system may aggregate the log information for multiple client devices. One benefit of this is that the aggregation takes into account the statistical randomization while providing a reliable measure of the visit conversion process. This is because in the aggregate, the number of false positives and false negatives introduced into the log data tend to cancel out. Thus, when the system evaluates the log data across a large data set, it will be able to determine whether client devices have tended to visit businesses and other points of interest after receiving search results from the web server.

As an added layer of protection, the "time to live" (TTL) for the log information stored by the server system, e.g., log information 268 in database 264 of FIG. 2B, may be selected for only a few days or hours. In one example, the TTL may be 3 days. In another example, it is less than one week. And in a further example, the TTL is selectively set by the system in accordance with factors including the quantity of log results received over a selected time period and the desired conversion information for visits responsive to search results.

Figure 5:
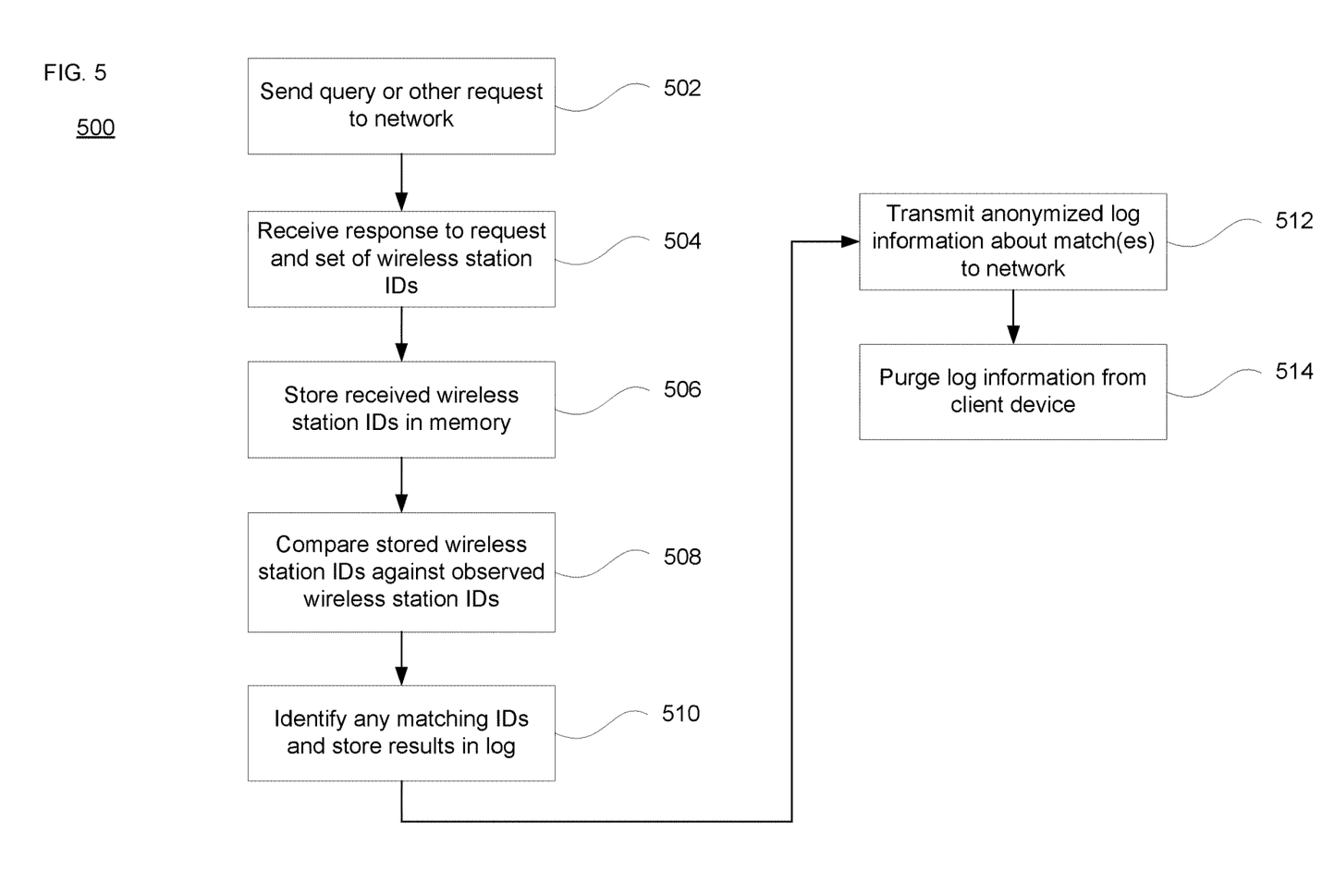
FIG. 5 illustrates a client device process in accordance with aspects of the disclosure.

One example of client device operation is shown in relation to flow diagram 500 of FIG. 5. Here, in block 502 the client device transmits a query or other request to one or more wireless stations of a communication network. In block 504, the client device receives a response to the request form the network, for instance from a web server associated with the network. The response includes one or more distinct identifiers for a set of selected wireless stations. The selected wireless stations are chosen in accordance with a location associated with the request. At block 506, the client device stores the received identifiers in local storage, such as in a database or lookup table.

Subsequently, at block 508, the client device compares the stored identifiers against observed wireless station identifiers. As noted above, this may be determined from a wireless station that the client device is actively communicating with. Or it may be a wireless station in a set of visible wireless stations observed by the client device at a particular location or within a given area.

At this point, if there is a match the mobile device indicates that in its log information, as shown in block 510. Then at block 512 the client device transmits the log information to the network. And as noted above, the log information is anonymized, and may be subject to additional protection prior to transmission via a statistical randomization approach so that no user ID or other client-identifiable information is included in the transmitted log information. Upon transmission or at a later point in time, the client device may purge the log information from memory as shown in block 514.

Figure 6:
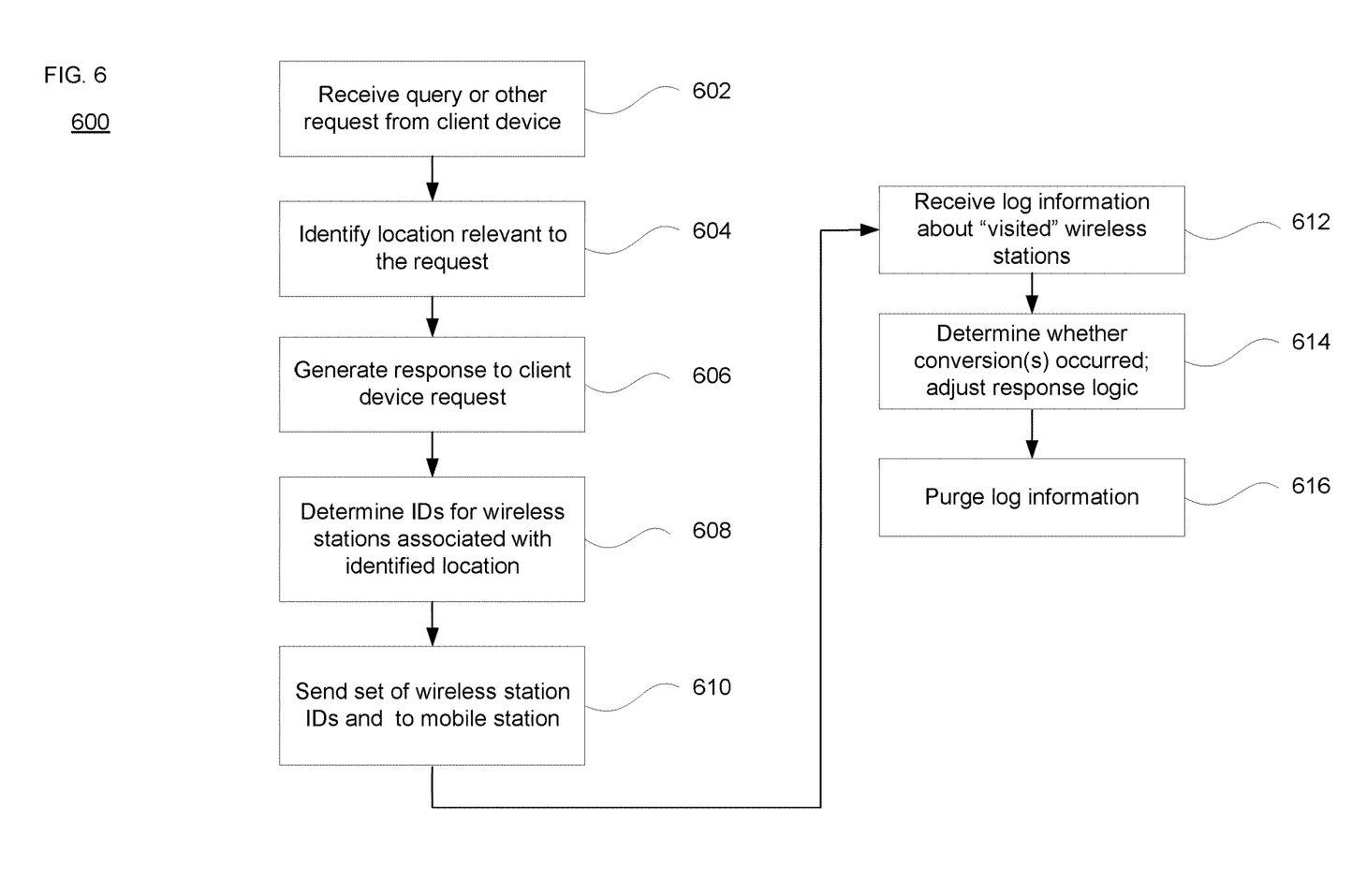
FIG. 6 illustrates a server-based process in accordance with aspects of the disclosure.

An example of network-side operation is shown in relation to flow diagram 600 of FIG. 6. Here, in block 602 the query or other request from the client device is received by the network, for instance at the web server described above. At block 604, processors of the web server or other network element evaluate the request and identify a location relevant to the query. This is done based on the information included or otherwise associated with the request.

A response to the request is generated based on the identified location at block 606. And at block 608, the system determines one or more distinct IDs for one or more respective wireless stations associated with the identified location. Such operations may occur in serial or in parallel. At block 610, the set of identifiers for the one or more wireless stations are transmitted to the client device for processing in the manner described above. This is preferably done in conjunction with transmitting the response to the query or other request.

In response to the comparison performed at the client device, at block 612 the log information from the client device is received. The log information generated by the client device is based on a determination of whether an identifier for a wireless station to which the mobile device is connected or is visible corresponds to an identifier of one of the wireless stations previously identified by the system. At block 614 the server system uses the log information to determine whether conversions occurred by the client device traveling to the location or other point of interest associated with the query or other search from block 602. In response to this, the system may adjust the process or logic used to generate future query responses. Thus, the system is able to improve the quality and usefulness of search results while also improving the reliability of the conversion information. This is done with minimal additional processing by the mobile devices, and with limited temporary data storage in the server's database. The system may periodically or selectively purge the received log data once the logs have been evaluated, as shown in block 616.

In another use case, as noted above the search may be performed on one client device and results returned to (or shared with) another client device associated with the user who submitted the query. For instance, the user may be logged in with the same account on multiple devices, or with or multiple browsers/clients in the same device. The "search client" itself can be any http client or browser application on any device in which the user is logged in. The network-side processing occurs in an equivalent manner as the single client device scenarios discussed above. In this case, the search client does not need to know anything about wireless station IDs or conversions by visiting locations or points of interest. Instead, the server would keep track of the relevant wireless station identifiers for each account, and send those identifiers to one or more of the user's devices to do the on-device comparison and matching asynchronously. The relevant client device(s) could employ a specific on-device application or other approach to perform the wireless station comparison and matching.

In this scenario, while the system may send the set of wireless station identifiers along with the search results to client device that initiated the request, it may also send just the search results to the requesting device and the set of wireless station identifiers to one or more other client devices associated with the user. For instance, if the user has a desktop, tablet and mobile phone and makes the query from the desktop, the web server may return the search results to the desktop. Then when the user logs in on their tablet and/or mobile phone, the set of wireless station identifiers may be sent to those client devices with or without the search results. Then the mobile client device(s) can perform the client-side processing as discussed above, with the results being returned to the network for conversion evaluation. The benefits discussed above apply to this approach as well. Comparisons and matches are performed using minimal on-device power, and the anonymized log information provides client-side protection while allowing the system to more effectively account for conversions.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A client device configured to:
   receive a search query from a user;
   send a search request, derived from the search query, to a search service server;
   receive, from the search service server, a response to the search request including one or more search results, the response also including at least one wireless station identifier for at least one wireless station located at a point of interest relevant to the search query;
   store the received at least one wireless station identifier in memory of the client device;
   identify, after receiving the response, using a communication module of the client device, one or more wireless station identifiers of one or more observed wireless stations;
   determine at least one of the one or more wireless station identifiers for at least one of the one or more observed wireless stations identified by the client device matches one of the stored at least one wireless station identifiers; and
   transmit a message identifying the match to a tracking service server.

2. A client device as claimed in claim 1, wherein one or more processors of the client device are configured to match the wireless station identifier for the observed wireless station with the stored at least one wireless station identifier by analyzing detected wireless signals from the observed wireless station for greater than a threshold period of time.

3. A client device as claimed in claim 1, wherein, prior to transmitting the message identifying the match to the tracking service server, matching data is stored in memory of the client device as log information.

4. A client device as claimed in claim 3, wherein the transmitted message includes the log information.

5. A client device as claimed in claim 3, wherein one or more processors of the client device are configured to perform statistical randomization on a portion of the log information prior to transmitting the message to the tracking service server.

6. A computer-implemented method, comprising:
   receiving a search query from a user of a client device;
   transmitting, by the client device, a search request in accordance with a search query to a search service server;
   receiving, at the client device from the search service server, a response to the search request, the response including one or more search results, the response also including at least one wireless station identifier for at least one wireless station located at a point of interest relevant to the search query;
   storing, in memory of the client device, the received at least one wireless station identifier;
   identifying, after receiving the response and using a communication module of the client device, one or more wireless station identifiers of one or more observed wireless stations;
   determining at least one wireless station identifier for at least one of the one or more observed wireless stations identified by the client device matches one of the stored at least one wireless station identifiers; and
   transmitting a message identifying the match to a tracking service server.

7. A computer-implemented method as claimed in claim 6, wherein matching the wireless station identifier for the observed wireless station with the stored at least one wireless station identifier includes analyzing detected wireless signals from the observed wireless station for greater than a threshold period of time.

8. A computer-implemented method as claimed in claim 6, wherein, prior to transmitting the message identifying the match to the tracking service server, the method includes storing matching data in memory of the client device as log information.

9. A computer-implemented method as claimed in claim 8, wherein the transmitted message includes the log information.

10. A computer-implemented method as claimed in claim 8, further comprising performing statistical randomization on a portion of the log information prior to transmitting the message to the tracking service server.

11. A server system, comprising:
   a processing module including one or more processors;
   a memory module having one or more memories configured to store data and instructions for execution by the processing module; and
   a communication module including a wireless transceiver configured for bidirectional communication with one or more remote devices including one or more wireless stations and one or more client devices;
   wherein the processing module is operatively coupled to the communication module, and is configured to:
   receive a search query from a client device;
   identify a location relevant to the received search query;

generate a response to the received search query including one or more search results associated with the identified location;

determine at least one wireless station identifier for at least one wireless station located at a point of interest at the identified location;

transmit the response and the at least one wireless station identifier to the client device; and in response to the transmission, receive a message from the client device, the message identifying that the client device has detected a wireless station identifier for an observed wireless station that matches one of the determined at least one wireless station identifiers; and determine, from the received message, whether a conversion occurred at the identified location.

12. A server system as claimed in claim 11, wherein the one or more processors are configured to determine whether the conversion occurred by analyzing whether the detected wireless station identifier for the observed wireless station matched the one of the stored at least one wireless station identifiers for greater than a threshold period of time.

13. A server system as claimed in claim 11, wherein the message includes log information indicative of whether a match occurred for a given one of the at least one wireless station identifiers.

14. A server system as claimed in claim 11, wherein the one or more processors of the processing module are configured to purge the message from memory after a selected period of time.

15. A server system as claimed in claim 11, wherein the client device includes a first client device and a second client device associated with a user, and:

the search query is received from the first client device associated with a user;

the response is transmitted to the first client device;

the at least one wireless station identifier is transmitted to the second client device associated with the user; and the message is received from the second client device.

16. A computer-implemented method, comprising:

receiving a search query from a client device;

identifying a location relevant to the received search query;

generating, by one or more processors of a server system, a response to the received search query including one or more search results associated with the identified location;

determining, by the one or more processors of the server system, at least one wireless station identifier for at least one wireless station located at a point of interest at the identified location relevant to the search query;

transmitting the response and the at least one wireless station identifier to the client device;

in response to the transmission, receiving a message from the client device, the message identifying that the client device has detected a wireless station identifier for an observed wireless station that matches one of the determined at least one wireless station identifiers; and determining from the received message, by the one or more processors of the server system, whether a conversion occurred at the identified location.

17. A computer-implemented method as claimed in claim 16, wherein the determining whether the conversion occurred includes analyzing whether the detected wireless station identifier for the observed wireless station matched the one of the stored at least one wireless station identifiers for greater than a threshold period of time.

18. A computer-implemented method as claimed in claim 16, wherein the message includes log information indicative of whether a match occurred for a given one of the at least one wireless station identifiers.

19. A computer-implemented method as claimed in claim 16, further comprising purging the message from memory of the server system after a selected period of time.

20. A computer-implemented method as claimed in claim 16, wherein the client device includes a first client device and a second client device associated with a user, and:

the search query is received from the first client device associated with a user;

the response is transmitted to the first client device;

the at least one wireless station identifier is transmitted to the second client device associated with the user; and the message is received from the second client device.

* * * * *